US008457785B2

(12) United States Patent
Tam et al.

(10) Patent No.: US 8,457,785 B2
(45) Date of Patent: Jun. 4, 2013

(54) BAG DISPENSING SYSTEM

(76) Inventors: Doron Tam, Tel Aviv (IL); Ari Bichler, Ramat Gan (IL); Yossi Bichler, Kfar Saba (IL)

( * ) Notice: Subject to any disclaimer, the term of this patent is extended or adjusted under 35 U.S.C. 154(b) by 336 days.

(21) Appl. No.: 11/682,905

(22) Filed: Mar. 7, 2007

(65) Prior Publication Data

US 2007/0198127 A1 Aug. 23, 2007

(30) Foreign Application Priority Data

Sep. 14, 2004 (IL) .......................................... 164091

(51) Int. Cl.
*G06F 17/00* (2006.01)

(52) U.S. Cl.
USPC ............ 700/244; 700/240; 700/236; 700/232

(58) Field of Classification Search
USPC ....................... 700/231–244; 221/1–312 C, 7
See application file for complete search history.

(56) References Cited

U.S. PATENT DOCUMENTS 3,503,481 A * 3/1970 Brenner ........................ 194/240
3,586,207 A * 6/1971 Brenner ........................ 221/259
3,749,218 A * 7/1973 Verbeke ........................ 194/247
3,807,123 A * 4/1974 Kihnke ........................... 53/502
4,177,621 A * 12/1979 Powell, Jr. ...................... 53/468
4,715,489 A * 12/1987 Verrelli ......................... 194/256
4,909,356 A * 3/1990 Rimondi et al. ................ 186/61
4,912,906 A * 4/1990 Toner .............................. 53/463
5,083,638 A * 1/1992 Schneider ....................... 186/61
5,174,413 A * 12/1992 Cappi et al. ..................... 186/66
5,313,766 A * 5/1994 Rimondi et al. ................ 53/451
5,345,071 A * 9/1994 Dumont ........................ 235/383
5,437,346 A * 8/1995 Dumont .......................... 186/61
5,473,865 A * 12/1995 Tanaka et al. ................... 53/502
5,641,039 A * 6/1997 Dumont .......................... 186/61
6,006,495 A 12/1999 Varichon
6,681,896 B1 1/2004 Davis
6,766,948 B1 * 7/2004 Burns ........................... 235/383
7,137,530 B2 * 11/2006 Chirnomas ................... 221/262
2004/0128025 A1 * 7/2004 Deal ............................ 700/236
2006/0207995 A1 * 9/2006 Erwin ........................... 221/211
2008/0121647 A1 * 5/2008 Erwin ............................... 221/7

FOREIGN PATENT DOCUMENTS

EP 0484300 X 2/2009
WO 2004/034342 A 3/1978

* cited by examiner

*Primary Examiner* — Michael K Collins
(74) *Attorney, Agent, or Firm* — Deborah Gador

(57) ABSTRACT

The present invention relates to a system for dispensing bags, particularly plastic bags, one at a time, particularly for use in stores and shopping areas. The system has an actuator for actuating a bag dispenser to dispense a single bag at a time. The actuator is coupled to a controller, which may be the controller of an electronic cash register or a store controller, for two-way communication, permitting control of the total number of bags dispensed to each customer. If desired, the rate at which the bags are dispensed can also be set and controlled. According to one embodiment, the system can also hold advertising material or other informational or aesthetic displays, and may include a media player for displaying advertising material aimed at the specific customer.

22 Claims, 9 Drawing Sheets

BAG DISPENSING SYSTEM

FIELD OF THE INVENTION

The present invention relates to devices for dispensing bags in general and, in particular, to systems for dispensing one single bag at a time in stores and shopping areas.

BACKGROUND OF THE INVENTION

Bags have been utilized for packaging store-bought goods for many years. In places where trees are plentiful, paper bags are utilized, which are easily separated from one another for use as needed. In other areas, plastic bags are preferred. These bags are packaged in stacks of flattened bags, or are sold as perforated sheets rolled about a core.

Regardless of the type or design of the bags used, the bags themselves are costly, so it is preferable to the storeowner that each customer take only as many bags as needed for his or her purchases. In particular, at present many customers take home a number of empty plastic bags for a variety of personal uses, in addition to those needed to wrap the customer's purchases. Furthermore, since plastic bags do not degrade, the billions and billions of plastic bags thrown away today are clogging up the land, the drains, the rivers, and the seas, and creating a severe, world-wide environmental problem. In order to solve this problem, some countries, like Ireland, have begun collecting taxes for each plastic bag taken from stores. In other areas, stores have begun charging customers for the bags they use or take away. Yet another solution is biodegradable plastic bags, although these are expensive to produce and have so far proved unsatisfactory in use.

Furthermore, since the bags are generally of plastic film, it is often difficult to open them. They usually must be crumpled or one side rubbed against the other, in order to open them. One solution to this problem was proposed in U.S. Pat. No. 6,006,495, which discloses an automatic bag dispenser. This device is located adjacent the cash register, under a conveyor or shelf, and includes two parallel rollers arranged to rotate in opposite directions and to engage a single bag between them, thereby folding the bag and removing it from the stack. The bottom of the bag, which is engaged first, is passed through a slot into a container, where one side of the bag remains held by the device. This permits the other side of the bag to be grabbed and the bag opened for filling with groceries.

Another device for dispensing plastic bags is shown in U.S. Pat. No. 5,174,413 to Cappi et al. This is an apparatus for dispensing and opening plastic bags from a continuous strip wound in a reel, and incorporates a scanner connected through a computer to a shutter located on a mouth through which a consumer may insert a product into the bag, so that the computer controls the opening of the shutter and the operation of the scanner. This apparatus is designed for self-service by the customer, and is designed to ensure that only one item at a time can be placed in the bag and only after being scanned.

Yet another device is shown in U.S. Pat. No. 5,437,346 to Dumont. This patent discloses a purchase checkout station to be used with a purchase monitoring device, which scans a bar code of an item to be purchased and transmits purchase and pricing information regarding the items to be purchased to the purchase checkout station. The purchase checkout station of this patent includes a verification platform whereon each item to be purchased is individually placed and verified as the item which has been scanned, whereafter the verified item to be purchased, and only that item, may be placed into an automatically positioned and opened bag which receives a predetermined quantity of items to be purchased therein and is sealed for secured removal by the consumer subsequent to payment. This apparatus is also designed for self-service by the customer, and provides coordination and verification that products scanned by the scanner are, indeed, the same products introduced into the bag.

These devices are constructed and adapted to permit controlled recording and packaging of purchased items. They are not concerned with the quantity of bags dispensed for each customer or with the timing of bag dispensing.

In order to encourage additional purchases by the customer, particularly of specific selected products, it is known to place advertisements or a list of commodities offered at a special price at the checkout station. In many cases, the cashier will suggest to each customer that he purchase one or more of these selected items.

Accordingly, there is a long felt need for a bag dispensing device which dispenses a single bag at a time and includes a control unit for controlling the number and rate of bags dispensed, and it would be very desirable to have such a device which provides two-way communication between the bag dispensing device and an electronic cash register or other electronic checkout station or a store controller for purposes of controlling dispensing of bags and collecting and transferring other information about and to each customer. In particular, it would be desirable to have a display, which is automatically controlled by the cash register or store controller and displays to each customer additional commodities which the store is interested in selling.

SUMMARY OF THE INVENTION

The present invention provides a system for controlling the dispensing of bags for use with a bag dispensing device which dispenses a single bag at a time. The system includes a controller and a communication network for two-way communication between the bag dispensing device and the controller. In this way, the number of bags taken can be monitored and controlled. According to one embodiment, the controller is an electronic cash register or other electronic checkout station where, in addition, information regarding the customer may be collected. If desired, a display may be provided mounted near the bag dispensing device, for displaying information from the controller aimed at that particular customer. According to a preferred embodiment, the display includes a media player, having a screen, which may be built into the bag dispensing device or mounted nearby.

There is thus provided, is accordance with the present invention, a bag dispensing system, for use with a bag dispenser having an actuator for dispensing a single bag at a time from a stack of bags, the system including a controller for controlling the actuator of the bag dispenser, and a communication network for two-way communication between the actuator and the controller, whereby the number of bags dispensed can be monitored and controlled.

Preferably, the controller is an electronic point of sale (EPOS) (e.g., electronic cash register) and the communication network is integrated with the store's existing electronic point of sale (EPOS) systems and stock databases. In this case, a central controller preferably controls the actuators of two or more bag dispensers. Furthermore, a wireless network media player may be associated with each EPOS. This provides a mechanism to deliver carrier bags to the customer and to control the number of bags released per customer and relate this quantity to pre-selected variables, such as total cost, physical volume or weight of purchased goods, or even customer responses to advertising messages.

According to one embodiment, the communication network is further coupled to a display. The display may be mounted on the bag dispenser itself or may be mounted nearby. In a retail setting, the display may be mounted adjacent the checkout station and coupled to the EPOS at the checkout station, for displaying advertising or other messages. Preferably, the display is coupled to a computerized controller, and may be coupled to the central computer of the store where it is used.

According to a preferred embodiment, the display includes a media player coupled to the controller and arranged to provide media information for display to a customer.

There is also provided in accordance with the present invention a method for dispensing a bag from a stack of bags, the method including coupling the actuator of a bag dispenser for dispensing a single bag at a time from a stack of bags to a controller, coupling a communication network for two-way communication between the bag dispenser actuator and the controller, and permitting the controller, by means of the communication network, to enable or disable the actuator, so as to permit or prevent the dispenser to dispense a bag.

According to one embodiment, the method further includes coupling a display associated with the bag dispenser to the communication network, and providing information to be displayed to a customer to the display over the communication network.

BRIEF DESCRIPTION OF THE DRAWINGS

The present invention will be further understood and appreciated from the following detailed description taken in conjunction with the drawings in which.

DETAILED DESCRIPTION OF THE INVENTION

The present invention relates to a system for dispensing bags, particularly plastic bags, one at a time, particularly for use in stores and shopping areas. The system has an actuator for actuating a bag dispenser to dispense a single bag at a time. The actuator is coupled to a controller, which may be the controller of an electronic cash register or a store controller, for two-way communication, permitting control of the total number of bags dispensed to each customer. If desired, the rate at which the bags are dispensed can also be set and controlled. According to one embodiment, the system can also hold advertising material or other informational or aesthetic displays, and may include a media player for displaying advertising material aimed at the specific customer.

For purposes of the present invention, the term actuator refers to any actuating means, whether electric, electronic, mechanical or any other actuator for causing the bag dispenser to dispense a bag.

Figure 1:
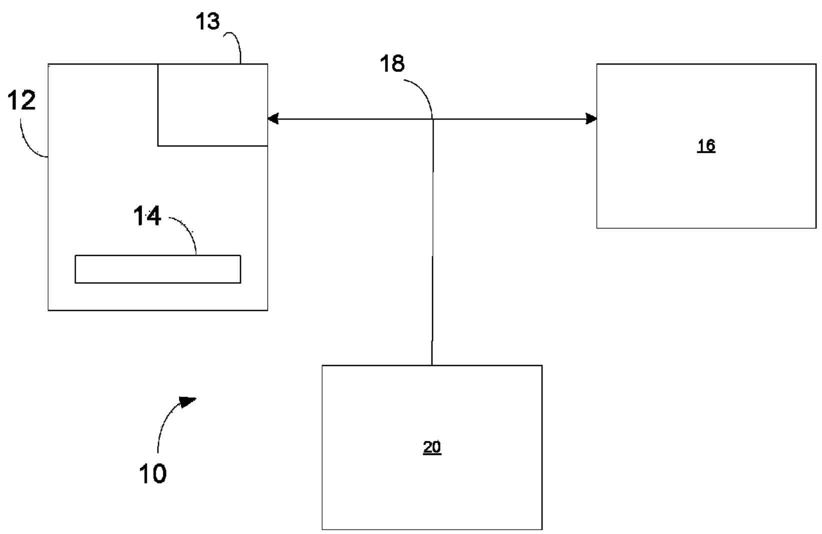
FIG. 1 is a schematic illustration of a system for dispensing bags constructed and operative in accordance with one embodiment of the present invention.

Referring now to FIG. 1, there is shown a schematic illustration of a system 10 for dispensing bags, constructed and operative in accordance with one embodiment of the present invention. System 10 includes a bag dispenser 12 which may be any device for dispensing a single bag at a time. A bag retrieval slot 14 or door is preferably provided to permit the removal of a dispensed bag. One example of a suitable bag dispenser is the bag dispensing device described and claimed in applicant's co-pending Israeli application number 159079, although conventional bag dispensing devices are also operative.

Bag dispenser 12 includes, or is coupled to, a dispenser actuator 13, which serves to actuate a motor or other element in the bag dispenser 12 to dispense a bag, or possibly to stop the bag dispenser from dispensing additional bags. Dispenser actuator 13 is coupled to a controller 16 by a two-way communication network 18. Controller 16 is arranged to send an enable or disable signal to actuator 13, to permit or prevent the activation, and thus dispensing, of a bag by the bag dispenser. Actuator 13 is capable of sending a signal to the controller each time a bag is dispensed. System controller 16 may be any suitable controller, preferably including a processor. Communication network 18 may be any two-way communication network, including, but not limited to, any form of wireless or wired communication, and includes the necessary protocols to permit the units of the system to communicate with one another. Communication network 18 permits the transfer of information between the dispenser actuator 13 and the system controller 16 via suitable interfaces, as known. In this way, the system controller can control the quantity and rate of dispensing of bags, while the bag dispenser provides feedback concerning the number of bags actually dispensed or removed. It will be appreciated that this simple embodiment can be utilized in any situation where it is desired to dispense one or more bags according to pre-selected parameters, by means of a computer program.

According to one embodiment of the invention, a display 20 is associated with the bag dispenser 12. Display 20 may also be connected to and controlled by controller 16. Display 20 may be any electronic display which is capable of receiving information for display from system controller 16 and/or from any other source. Display 20 may be mounted on the bag dispenser 12, on a cash register or a till adjacent the system 10, or in any other suitable location for permitting display of information directed to a person standing near the bag dispenser. It is a particular feature of the present invention that the same controller and communication network that control and direct the bag dispenser may be employed to control the display and provide information thereto.

It will be appreciated that communication network 18 may provide any sort of communication between system controller 16 and actuator 13 and/or display 20 including, but not limited to, communication over wires, wireless communication, and communication using any conventional communication protocol, such as IR, WAP, Blue Tooth, etc.

Figure 2:
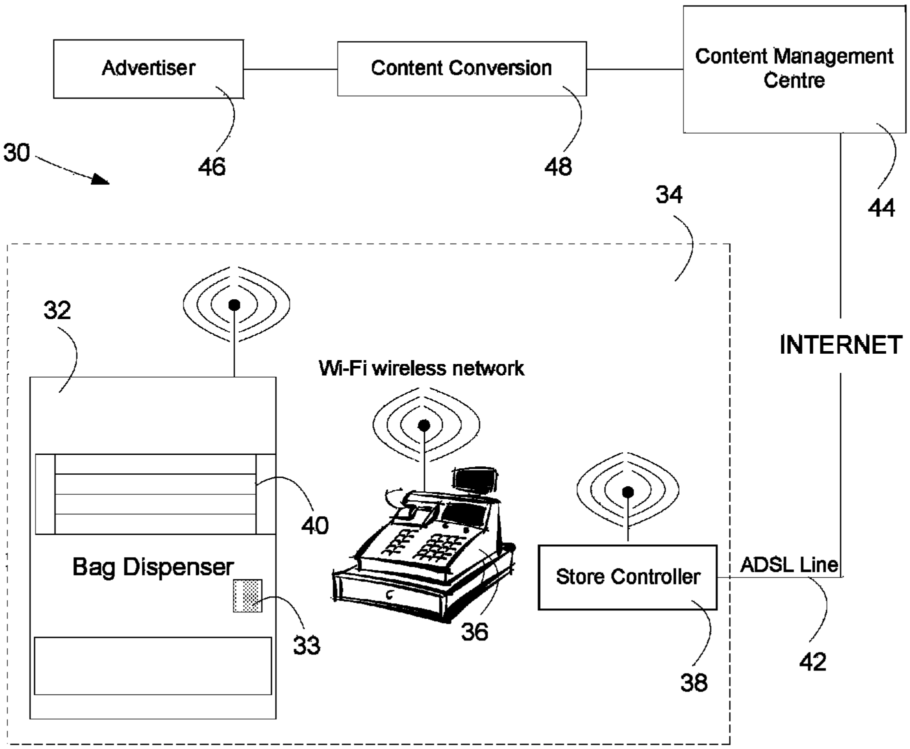
FIG. 2 is a schematic illustration of a system for dispensing bags constructed and operative in accordance with another embodiment of the present invention.

Referring now to FIG. 2, there is shown a schematic illustration of a system 30 for dispensing bags constructed and operative in accordance with another embodiment of the present invention. System 30 includes a plurality of bag dispensers 32, of which only one is shown, for ease of description. Each bag dispenser 32 has an actuator 33, which is responsible for actuating a motor or other element in the bag dispenser to dispense a bag. Each actuator 33 is coupled for two-way communication with a computerized controller. In this embodiment, the controller is part of a store electronic point of sale (EPOS) system 34, which includes a plurality of electronic cash registers 36 coupled to a store controller 38 and stock databases (not shown). This arrangement permits two-way communication of data, such as via a Wi-Fi wireless network, between the cash register 36 and the store controller 38 regarding purchased items, the price, and possibly weight or volume, of the specific purchased item, details of the purchaser including his prior purchases in the store, etc. In this case, the bag dispenser actuator 33 will also be coupled for two-way communication with the cash register 36 and store controller 38. Thus, the system can be arranged so that the cash register 36 controls the operation of the actuator of the bag dispenser, or so that the store controller 38 automatically controls the operation of the actuator, directly. If the store controller controls the bag dispenser actuator, preferably the cash register is provided with an override mechanism, to permit the cashier to dispense additional bags, as required by the special needs of a particular customer. This can be accomplished by providing a button on an EPOS user interface, which can be hit by the cashier to trigger the release of a bag. In cases where the actuator is set to automatically dispense a bag as soon as one is removed, the dispenser can report back to the EPOS system the number of bags supplied to a customer, and thereby enable the cashier to charge the customer a set amount for each bag taken. In this case, the controller can be arranged to enable or disable the actuator, but does not control the rate of bag dispensing, which is dependent only on the speed with which the dispensed bags are taken by the customer. However, in other cases, where the actuator need not wait until the customer removes a dispensed bag, the controller determines the rate at which bags are dispensed. This rate can be adjusted, as desired.

According to one embodiment of the invention, where the stock information database of the store permits, the system may use variables, such as weight or physical dimensions of purchases, to determine an appropriate number of bags to be dispensed to a particular customer. Such a program could determine the required number of bags by providing the controller with data of, for instance, the categories of goods (heavy, large, small, food or cleaning supplies, etc.) and the number of units purchased in each category and their physical size. Alternatively, the cash register could include such a program for automatically determining the number of required bags, and cause the device to dispense that number. An option can be provided for the cashier to indicate if the customer is elderly or has a physical limitation requiring lighter than normal packing (i.e., requiring a larger number of bags), or such information can be provided on a loyalty or other ID card held by the customer and entered by the cashier into the store controller or EPOS system.

Alternatively, the bags may be dispensed based on the value of the goods being purchased. The actual monetary values are variables, which can be configured differently for each client, or even for different tills within the same store (i.e., express check-out counters vs. regular check-out counters).

Additionally or alternatively, the controller can be used to permit the cashier to activate the bag dispenser to dispense a desired number of bags, i.e., a number paid for in advance by the customer, or to which he is entitled, due to the quantity and size of his or her purchases. In addition, the system controller can be used to collect data, e.g. count the number of bags used and/or remaining in the stack of unused bags, for purposes of stock control, budgeting, accounting, and the like.

According to a preferred embodiment of the invention, a display 40, such as an LCD/TFT screen, is built into each bag dispenser 32. The screen may be connected to a self-contained Linux based media player (not shown), which stores video, audio and HTML content on removable solid state memory cards. The media player may be connected via a wireless LAN to the store controller 38, which may be a self-contained Linux PC that is, in turn, connected via an ADSL line 42 to the Internet. A central content management centre 44 is connected to each of the store controllers 38 via the Internet and distributes new information or play lists to each of the store controllers 38, which then disseminate the data over the wireless LAN to the individual media players associated with each of the bag dispensers. The screens in each individual dispenser can be set to play different content at different times of the day, thus enabling the information to be targeted at specific groups of shoppers (for example, pensioners and young mothers during the daytime). Each of the media players may also keep a log of the content that it has delivered and can report these statistics back to the store controller, which, in turn, uploads them to the central system. The content management centre 44 may receive the content in any fashion and from any source. In the embodiment illustrated in FIG. 2, each advertiser 46 provides its desired advertising content to a converter 48 for conversion to the appropriate CODEC, such as MPEG2. The converter 48, in turn, provides the converted content to the content management centre 44.

Figure 3:
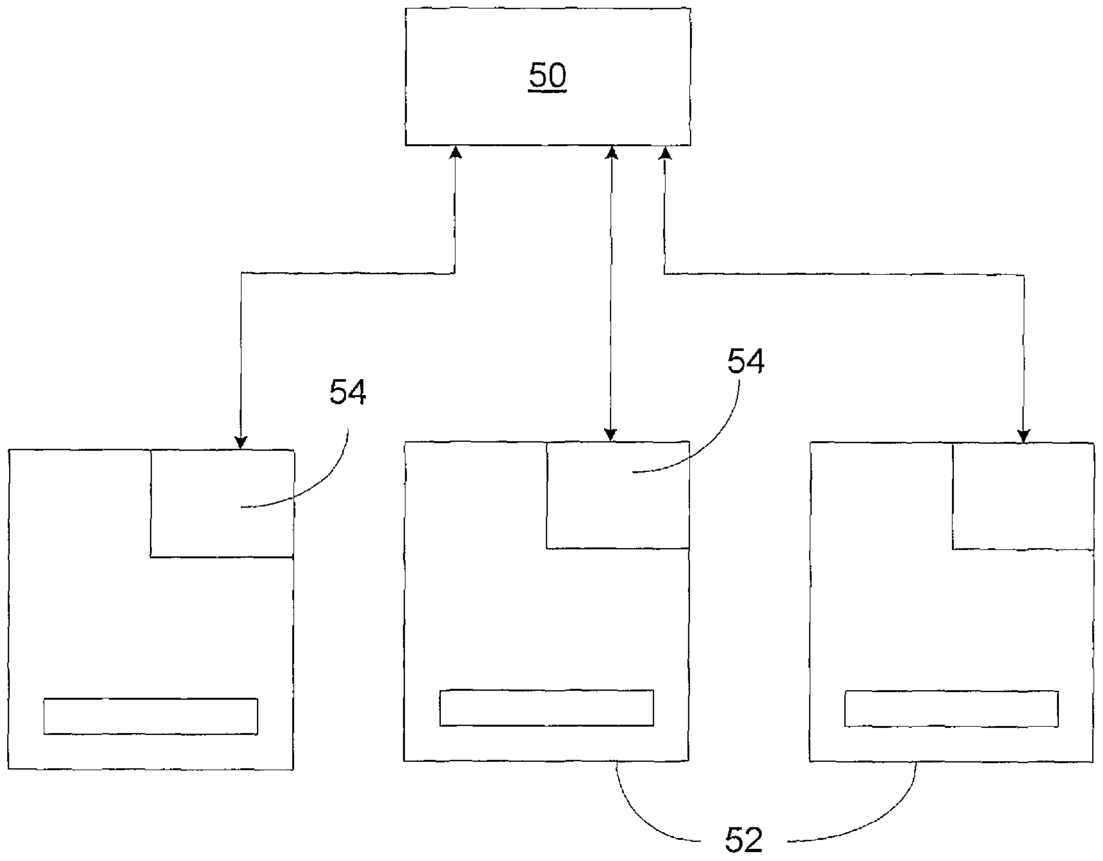
FIG. 3 is a schematic illustration of a system for dispensing bags constructed and operative in accordance with a further embodiment of the present invention.

According to an alternative topology, the media content to be displayed may be stored in the store controller, as illustrated schematically in FIG. 3. In FIG. 3, the store controller 50 is coupled to a plurality of display units 54, here illustrated as being mounted on bag dispensers 52. According to one mode of operation, store controller 50 essentially broadcasts the media content, as desired, to each of the various display units 54. In this case, the same content is displayed at the same time on all the screens.

According to another mode of operation, the media content is also stored centrally in the store controller 50. However, in this case, the content is simulcast to the various display units 54. This permits different content to be displayed on each screen independently. However, this topology is limited by the available bandwidth of the communication network between the store controller and the display units.

According to one embodiment of the invention, the display includes a touch screen to permit interactive communication with the customers. Thus, for example, the touch screen may display a plurality of special offers, additional information regarding certain products, and so forth, and the customer can purchase or order such items by touching the appropriate locations on the screen.

According to an alternative embodiment, the store controller may provide content to the display according to various parameters of the individual consumers. Thus, certain special sale items may be presented to a consumer based on his or her personal data, including current and/or past purchases.

Operation of the system of the present invention is as follows. A bag dispenser, having an actuator for causing the bag dispenser to dispense a single bag at a time from a stack of bags, is coupled to a controller. A communication network is coupled for two-way communication between the bag dispenser actuator and the controller, so as to permit communication of control signals and/or data regarding the number of bags between the controller and the bag dispenser. Preferably, a display is mounted on or near the bag dispenser and coupled to the communication network. The controller sends selected content, or a play list of pre-recorded stored content, to each display for displaying information to a customer at a check out counter near the bag dispenser.

The method of using the system of the present invention to control the number of bags dispensed, as well as the information being displayed to a consumer, will now be described with reference to FIGS. 4 to 9, which illustrate different modes of operation. The system of the present invention is mounted at a checkout counter in a store having an EPOS system. The cashier at the checkout counter enters details of each item purchased by the consumer to the EPOS system, as by causing a bar code reader coupled to the EPOS system to scan a bar code on each item, or by inputting an identifying code to the system. The EPOS system converts the bar code, or other input code, into the category, volume, weight, and/or dimensions of the item purchased.

Figure 4:
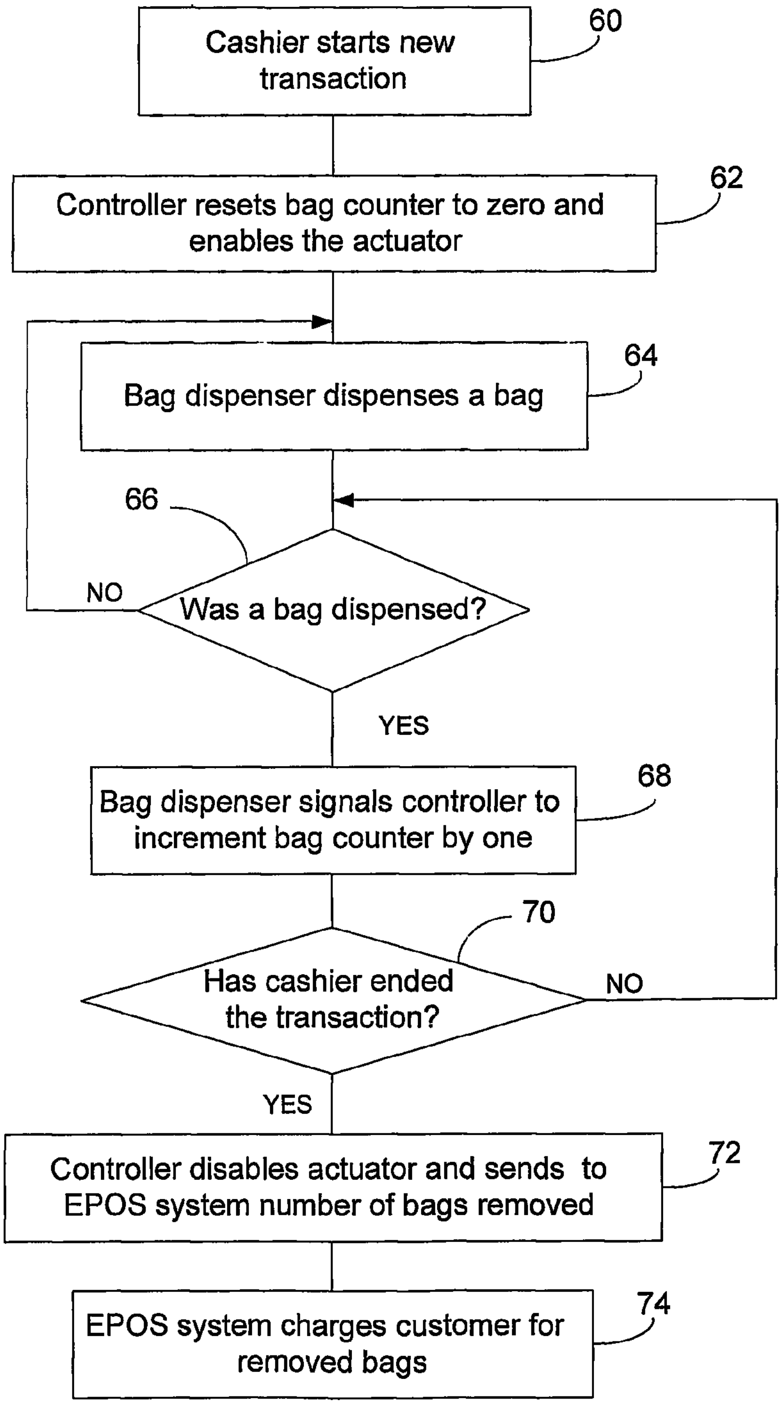
FIG. 4 is a flow chart illustrating the operation of the bag dispensing system according to one embodiment of the invention.

Referring to the mode of FIG. 4, the cashier starts a new transaction by scanning the purchases for a new customer (block 60). The store controller resets the bag counter to zero and enables the actuator of the bag dispenser (block 62). The bag dispenser now begins to automatically dispense bags, one at a time (block 64). The controller checks whether the bag dispenser has sent a signal indicating that a bag has been dispensed (block 66), and the bag dispenser signals the controller to increment the bag counter by one (block 68). The EPOS system determines whether or not the cashier has ended the transaction (block 70). If not, the bag dispenser dispenses another bag (block 66). As soon as all the items have been scanned by the cashier, and all the information about the purchases is collected, the store controller disables the actuator so no additional bags will be dispensed. The total number of bags taken by the customer (according to the counter) is reported to the EPOS system (block 72), and the EPOS system may charge the customer for the bags used (block 74).

Figure 5:
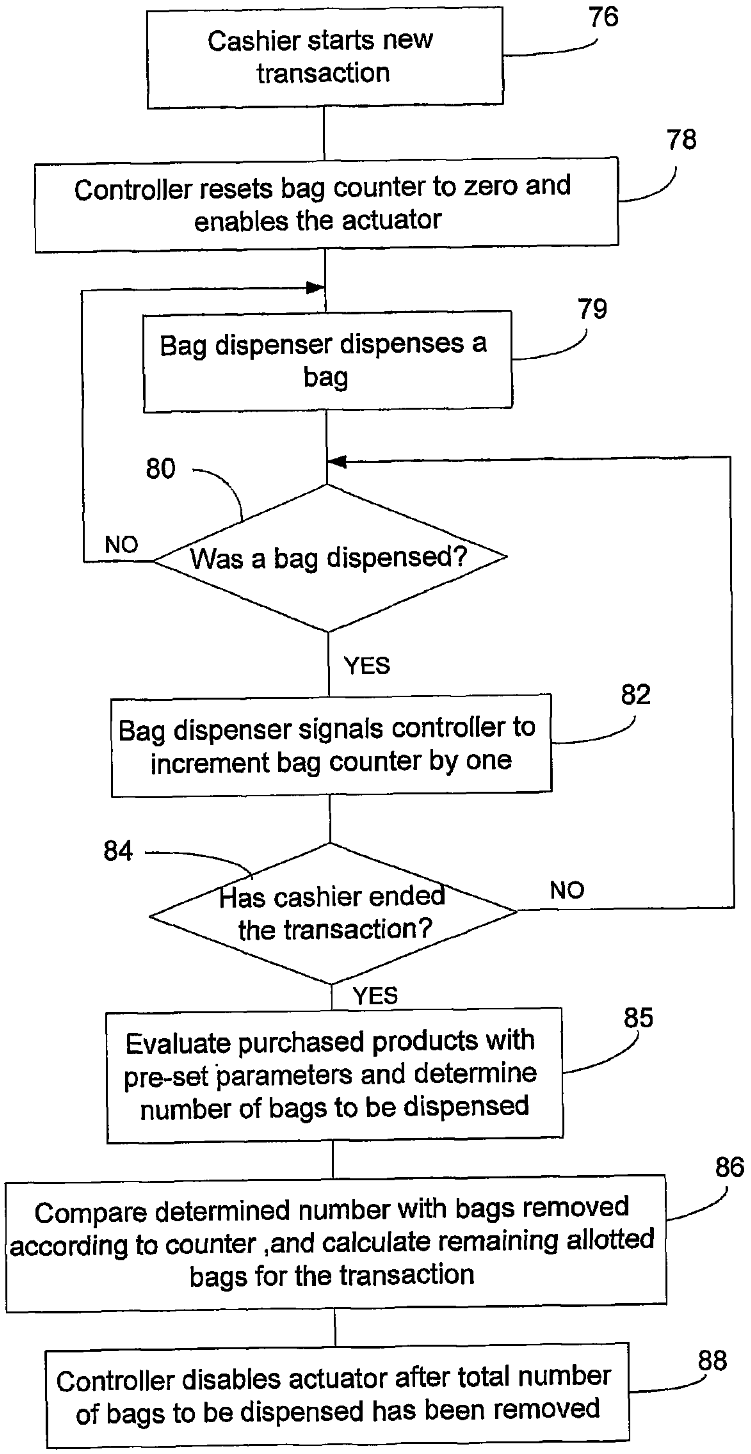
FIG. 5 is a flow chart illustrating the operation of the bag dispensing system according to another embodiment of the invention.

An alternative mode of operation is shown in FIG. 5. Here, the cashier starts a new transaction (block 76) by scanning the purchased items. The controller resets the bag counter to zero and sends a signal to enable the actuator to permit the dispensing of bags (block 78). The bag dispenser automatically dispenses a bag (block 79) and the customer can remove the bag and start to pack his purchases. The controller checks whether the bag dispenser has sent a signal indicating that a bag has been dispensed (block 80) and, if not, the bag dispenser dispenses another bag (block 79). If a bag has been dispensed, the bag dispenser signals the controller to increment the bag counter by one (block 82). The EPOS system determines whether or not the cashier has ended the transaction (block 84). If not, the system determines whether another bag has been dispensed (block 80).

At the end of the transaction, the purchased produces are evaluated in light of pre-set parameters, and the total number of bags to which the customer is entitled, based on pre-selected parameters and criteria, is calculated by the store controller (block 85). The controller compares the calculated number of bags with the number of bags removed, according to the counter, and determines the additional number of bags to be dispensed to this customer (block 86). After the total number of bags to be dispensed has been removed by the customer, the store controller disables the actuator of the bag dispenser, to prevent dispensing of further bags (block 88). It will be appreciated that, upon request of the consumer and according to the discretion of the cashier, more bags may be provided to a particular consumer by actuating the bag dispenser manually, by means of an override system.

Figure 6:
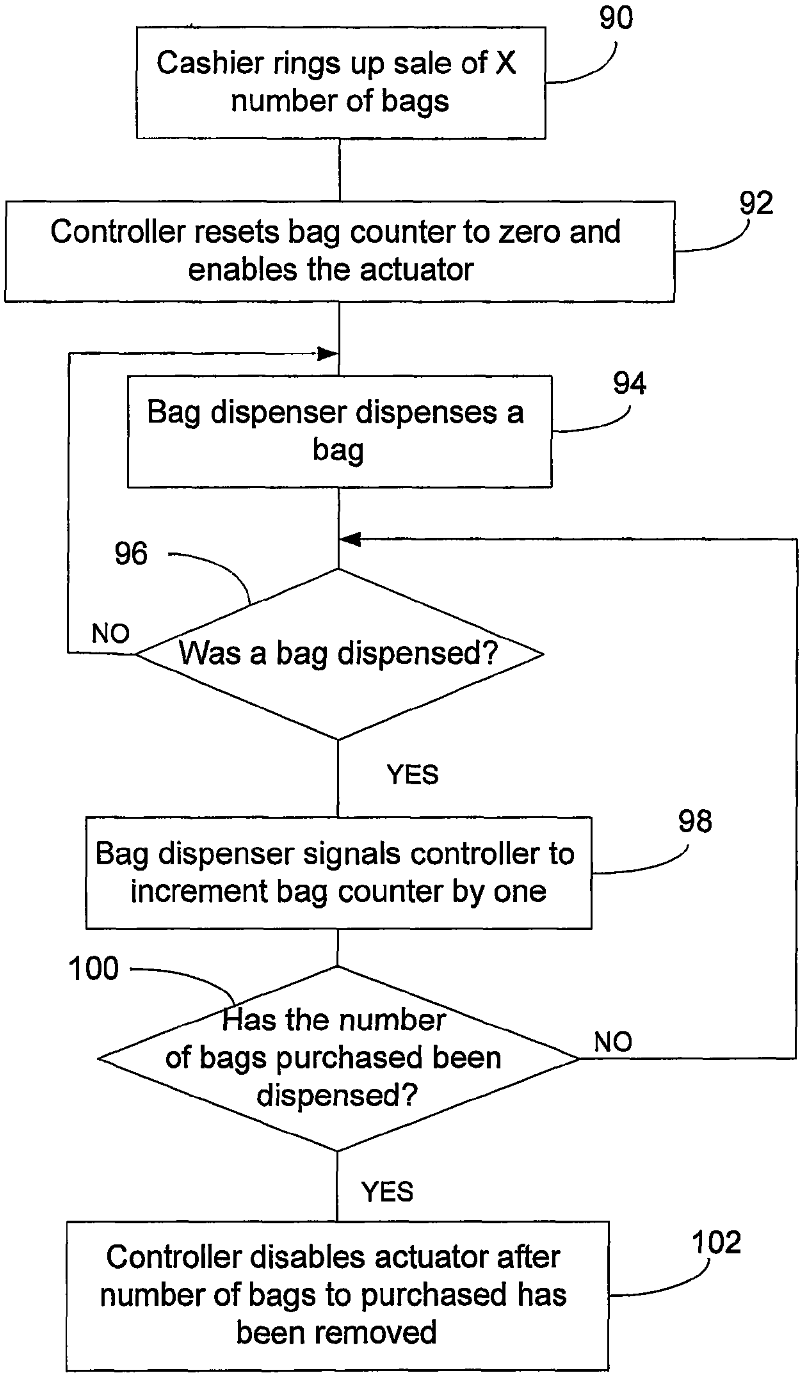
FIG. 6 is a flow chart illustrating the operation of the bag dispensing system according to a further embodiment of the invention.

Yet another mode of operation is illustrated in FIG. 6. In this mode, at the start of a new transaction, the cashier rings up the sale of a selected number of bags (block 90) to be dispensed for this particular purchase for this consumer, based on pre-selected parameters and criteria. The controller resets the bag counter to zero and enables the actuator of the bag dispenser (block 92). The bag dispenser automatically dispenses a bag (block 94) and the customer can remove the bag and start to pack his purchases. The controller checks whether the bag dispenser has sent a signal indicating that a bag has been dispensed (block 96) and, if not, the bag dispenser dispenses another bag (block 94). When a bag is removed, the bag dispenser signals the controller to increment the bag counter by one (block 98). The store controller determines whether the number of bags removed is equal to the number of bags purchased (block 100). If so, the store controller disables the actuator to prevent is from dispensing any further bags (block 102). If not, the controller checks whether a bag has been dispensed (block 96).

Figure 7:
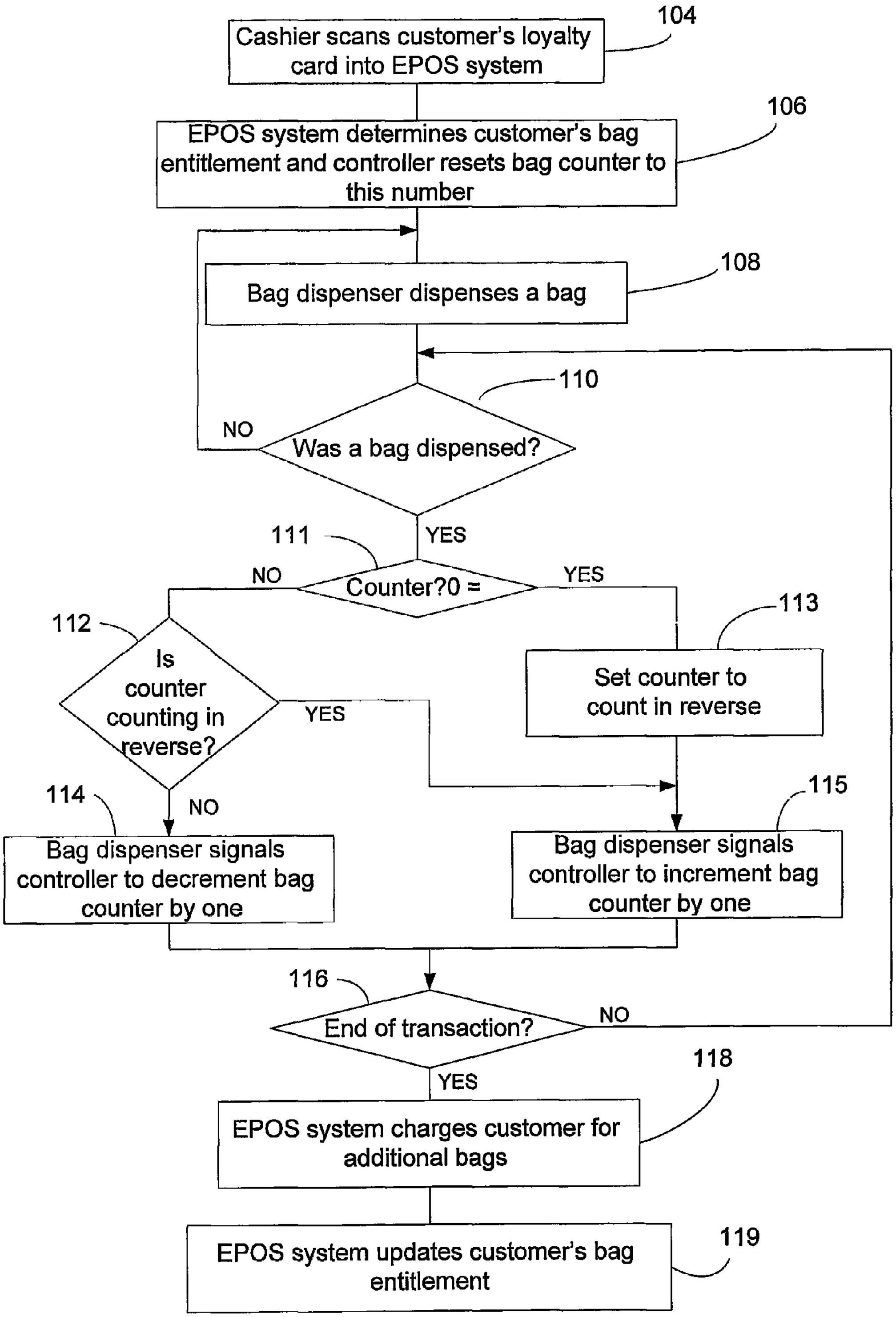
FIG. 7 is a flow chart illustrating the operation of the bag dispensing system according to still another embodiment of the invention.

According to a preferred embodiment, personal information about the customer is entered into the controller by the cashier prior to scanning the purchased items, as illustrated in FIG. 7. This may be accomplished by typing in an identification number or by scanning a magnetic or other loyalty card into the controller (block 104), which reads information stored thereon about this customer, or retrieves personal information stored in a store database or the EPOS system. This information may be used by the controller to determine or adjust the number of bags dispensed, if necessary, due to the special needs of the customer, for example, more bags to an elderly purchaser, so that each filled bag is lighter in weight. Thus, the EPOS system informs the store controller of any special entitlement of the customer to bags, and the controller resets the bag counter to this number (block 106). The cashier then begins to scan each purchased item, as described above. The bag dispenser dispenses a bag (block 108), and the customer can remove the bag and begin to pack her purchases. Once a bag has been dispensed (block 110), the controller determines whether the bag counter registers zero (block 111), i.e., has the total number of bags allocated to that customer has been dispensed. If so, the counter is set to reverse the direction of counting (i.e., to increase rather than decrease, so as to count the number of bags removed in excess of the bag entitlement) (block 113) and the counter is incremented by one (block 115). If the counter does not register zero, the controller determines whether the counter has been reversed (block 112). If not, the controller decrements the bag counter by one (block 114). If the counter has been reversed, the controller increments the bag counter by one (block 115).

The EPOS system now determines whether or not the cashier has ended the transaction (block 116). If so, the EPOS system sends a signal to the controller, which determines the number of bags removed in excess of the customer's entitlement, and charges the customer for these bags (block 118). According to one embodiment of the invention, the EPOS system may now update the customer's bag entitlement, following the last transaction (block 119).

It will be appreciated that scanning the purchases of each customer together with a loyalty card allows the EPOS system to collect information about the purchases of this customer. Such information can be used to determine the customer's purchasing habits and preferences, which can be used to personalize information or advertisements displayed to the customer when checking out. The controller may also take into account the previous purchases of this customer.

It will be appreciated that all the above described methods are based on utilizing pre-selected criteria to determine the number of bags to be dispensed to each customer. These criteria can include data collected from a membership card, data previously stored in a client database and/or a store stock database, or data input during each purchasing transaction, such as the number of bags purchased by the customer at the start of the transaction, and so forth.

Figure 8:
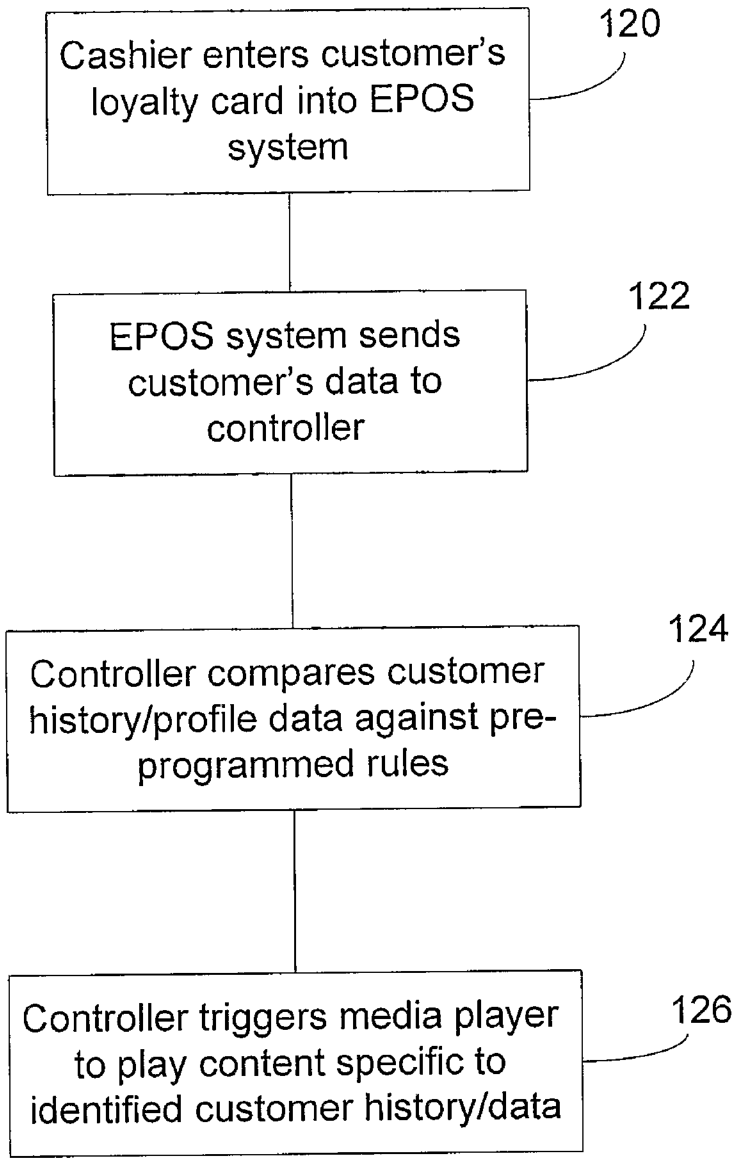
FIG. 8 is a flow chart illustrating the flow of data in the bag dispensing system according to another embodiment of the invention.

For example, as shown in FIG. 8, the customer's loyalty card is scanned into the EPOS system (block 120) when he reaches the cashier. The EPOS system passes selected information about the customer to the store controller (block 122). The store controller compares the customer's purchasing history and/or profile data, which has been retrieved from the EPOS system, against a set of pre-programmed rules regarding selection of advertising content to be displayed to that customer (block 124). The pre-programmed rules determine the information to be displayed, based on data selected from the purchasing or biographical data of the customer, data stored on a membership card of the customer, or any preselected advertising information. In accordance with the preprogrammed rules, the controller triggers a media player associated with a display located adjacent the customer to play information specific to that customer history and/or data (block 126).

Figure 9:
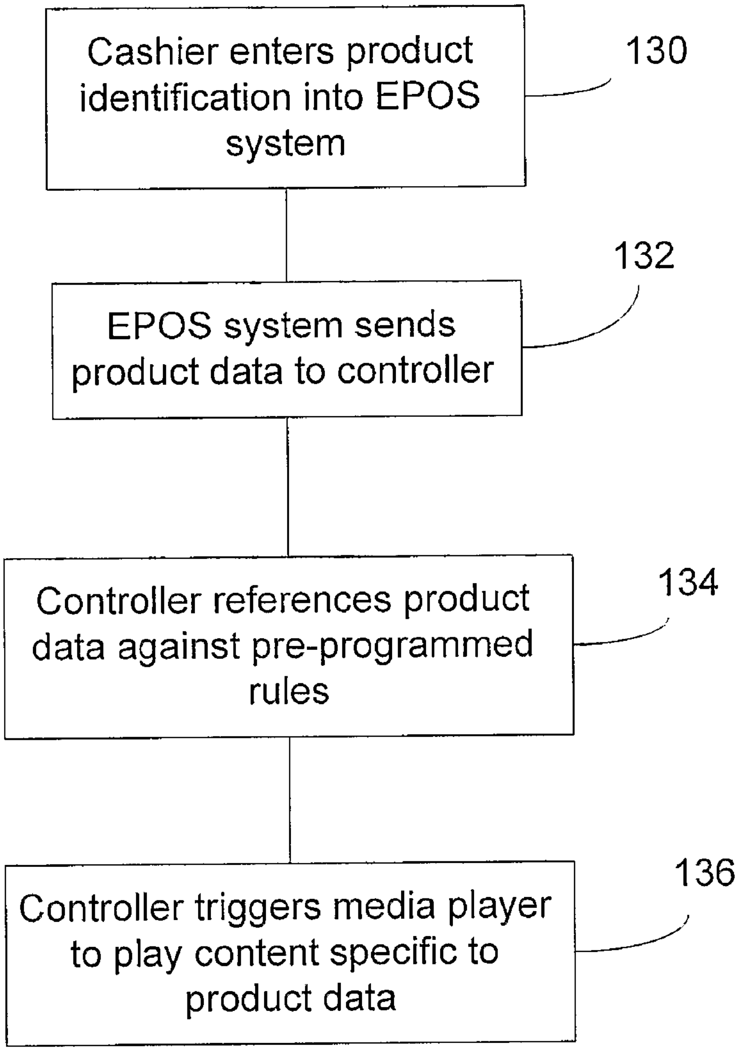
FIG. 9 is a flow chart illustrating the operation of the bag dispensing system with a display, according to a preferred embodiment of the invention.

An alternative method of selecting advertising content to be displayed to a customer at the check out counter is illustrated in FIG. 9. In this embodiment, the information is selected in accordance with the items purchased by the customer. Thus, the cashier scans each product into the EPOS system (block 130). The EPOS system passes details of each item to the store controller (block 132). The store controller references the product data against a set of pre-programmed rules regarding selection of advertising content to be displayed to the purchaser of those items (block 134). In this embodiment, the pre-programmed rules determine the information to be displayed, based on details of the goods purchased by the customer or any pre-selected advertising information. In accordance with the pre-programmed rules, the controller triggers a media player associated with a display located adjacent the customer to play content specific to those purchased products (block 136).

It will be appreciated that both of these situations can occur in a single embodiment. In this case, the controller utilizes both historical information about customer's previous purchases and information regarding the current transaction to select the appropriate content to be displayed.

While the invention has been described with respect to a limited number of embodiments, it will be appreciated that many variations, modifications and other applications of the invention may be made. It will further be appreciated that the invention is not limited to what has been described hereinabove merely by way of example. Rather, the invention is limited solely by the claims that follow.

The invention claimed is:

1. An Electronic Point of Sale (EPOS) system, comprising:

at least one bag dispenser configured to dispense a single empty bag at a time from a stack of empty bags;

an actuator configured to activate said bag dispenser to dispense the single bag;

an electronic cash register at a checkout station, said cash register having a controller coupled to said actuator of said bag dispenser, said controller being arranged to send an enable or disable signal to said actuator, to permit or prevent the activation of the bag dispenser and, thus, permit or prevent dispensing of a bag;

said controller being programmed to calculate a number of empty bags to be dispensed to a customer;

said controller configured to send said enable signal to said actuator, to permit said bag dispenser to dispense said calculated number of empty bags, said actuator being configured to send a signal to said controller when a bag is dispensed to count a number of bags that have been dispensed; and said controller being configured to send said disable signal to said actuator to prevent said bag dispenser from dispensing bags, when said calculated number of bags has been dispensed.

2. The system according to claim 1, wherein said controller is programmed to calculate said number of empty bags to be dispensed to a customer based on at least one pre-selected variable relating to said purchased goods, said variable selected from data characterizing goods purchased by said customer, biographical data of said customer, a number of purchased bags, data collected from a membership card, and bag entitlement of said customer.

3. The system of claim 1, wherein said controller is programmed to calculate said number of empty bags to be dispensed to a customer based on at least one variable relating to said purchased goods and selected from the group including: total cost of purchased goods; physical volume or weight of purchased goods; categories of goods and a number of units purchased in each category and their physical size, said variable being calculated from information from a stock information database coupled to said cash register.

4. The system according to claim 3, wherein said cash register is programmed to calculate said number of empty bags to be dispensed to a customer also using pre-selected criteria relating to said customer.

5. The system according to claim 1, further comprising:

a central controller coupled to said electronic cash register; and a store stock database coupled to said central controller;

said central controller and said store database coupled to each other and to said electronic cash register by a two-way communication network.

6. The system according to claim 5 further comprising at least one display on said bag dispenser coupled to said central controller for display of media information from said central controller on said display.

7. The system according to claim 6, further comprising a central content management center connected to said central controller, whereby said central controller receives media information from said central content management center for display on the display.

8. The system according to claim 7, further comprising a converter coupled to said central content management center for conversion of received advertising information to an appropriate CODEC.

9. The system according to claim 5, wherein said central controller further includes a client database including biographical and purchasing data of a plurality of clients, accessible by said central controller.

10. The system according to claim 5, wherein said electronic cash register comprises a plurality of electronic cash registers each at a checkout station, each said cash register having a controller coupled to an actuator of a single bag dispenser for controlling said actuator so as to control bag dispensing;

said central controller being coupled by said two-way communication network to each of said plurality of electronic cash registers to control the actuators of the plurality of bag dispensers and to receive data of customer purchases collected by each of said electronic cash registers.

11. The system according to claim 1, further comprising at least one display disposed adjacent said cash register coupled to said controller for display of media information from said central controller on said display.

12. A method for dispensing empty bags from a stack of empty bags, the method comprising:

enabling an actuator of an empty bag dispenser by a controller of an electronic cash register or a checkout station, so as to permit said actuator to activate said bag dispenser to dispense a single empty bag at a time from a stack of empty bags;

calculating, by said controller, a number of empty bags to be dispensed for a customer, for packing goods purchased by said customer;

dispensing, one at a time, said calculated number of empty bags;

said actuator sending a signal to said controller when each said empty bag is dispensed by said bag dispenser; and determining whether said calculated number of dispensed bags has been dispensed; and disabling said actuator by said cash register controller when said calculated number of empty bags has been dispensed.

13. The method according to claim 12, further comprising coupling said electronic cash register to a central controller by means of a two-way communication network; and coupling a display to said central controller for display of media information from said central controller on said display.

14. The method according to claim 13, wherein said media information is selected in accordance with a set of pre-programmed rules regarding selection of advertising content to be displayed to that customer.

15. The method according to claim 14, further comprising:

scanning a customer's loyalty card into an EPOS system coupled to a store controller;

passing information about the customer from said EPOS system to the store controller;

comparing the information about the customer against said set of pre-programmed rules regarding selection of advertising information to be displayed to that customer; and triggering a media player associated with said display to play information selected in accordance with said pre-programmed rules.

16. The method according to claim 15, wherein said pre-programmed rules determine information to be displayed, based on data selected from: said details of goods purchased by the customer; purchasing or biographical data of a customer; data stored on a membership card of a customer; and pre-selected advertising information.

17. The method according to claim 12, further comprising:

inputting details of purchased goods into an EPOS system coupled to a store controller;

passing information about said purchased goods from said EPOS system to the store controller;

comparing said information about said purchased goods against a set of pre-programmed rules regarding selection of advertising information to be displayed to a purchaser of said goods; and triggering a media player associated with said display to play information selected in accordance with said pre-programmed rules.

18. The method according to claim 12, further comprising:

coupling said electronic cash register to a central controller by means of a two-way communication network;

inputting details of purchased goods into the central controller; and wherein step of calculating includes calculating said number of bags based also on said input details.

19. The method according to claim 12, further comprising:

coupling, by a two way communication network, said electronic cash register to a central controller in an electronic point of sale (EPOS) system in a store; and coupling at least one stock database of said store to said central controller and to said electronic cash register via said communication network.

20. The method according to claim 19, further comprising:

building a client database in said central controller, said client database including biographical and purchasing data of a plurality of clients, accessible by said central controller.

21. The method according to claim 12, wherein said step of calculating includes calculating said number of empty bags to be dispensed to a customer based on at least one pre-selected variable relating to said purchased goods, said variable calculated from information from a stock information database coupled to said cash register.

22. The method according to claim 12, further comprising counting, by said controller, a number of unused bags for purposes of stock control.

* * * * *